United States Patent
Weitzman et al.

(10) Patent No.: US 12,354,211 B2
(45) Date of Patent: Jul. 8, 2025

(54) RAY TRACING BETWEEN AR AND REAL OBJECTS

(71) Applicant: Snap Inc., Santa Monica, CA (US)

(72) Inventors: Ron Weitzman, Tel Aviv (IL); Oleksandr Pyshchenko, Los Angeles, CA (US); Raz Perlman, Rehovot (IL); Vivian Su, Maynard, MA (US); Almog Mizrahi, Tel Aviv (IL)

(73) Assignee: SNAP INC., Santa Monica, CA (US)

( * ) Notice: Subject to any disclaimer, the term of this patent is extended or adjusted under 35 U.S.C. 154(b) by 142 days.

(21) Appl. No.: 18/179,920

(22) Filed: Mar. 7, 2023

(65) Prior Publication Data

US 2024/0303904 A1    Sep. 12, 2024

(51) Int. Cl.
*G06T 15/06* (2011.01)
*G06T 19/00* (2011.01)

(52) U.S. Cl.
CPC ............ *G06T 15/06* (2013.01); *G06T 19/006* (2013.01)

(58) Field of Classification Search
CPC .............................. G06T 15/06; G06T 19/006
See application file for complete search history.

(56) References Cited

U.S. PATENT DOCUMENTS

| | | | |
|---|---|---|---|
| 10,319,094 B1 | 6/2019 | Chen et al. | |
| 10,607,567 B1* | 3/2020 | Schritter | G09G 5/06 |
| 11,024,060 B1 | 6/2021 | Ma et al. | |
| 11,335,077 B1 | 5/2022 | Salmani Rahimi et al. | |
| 11,430,247 B2 | 8/2022 | Kokkinos et al. | |
| 2010/0085425 A1* | 4/2010 | Tan | H04N 13/337 348/E13.001 |
| 2010/0277478 A1* | 11/2010 | Ihm | G06T 15/503 345/611 |
| 2011/0026808 A1 | 2/2011 | Kim et al. | |
| 2013/0033486 A1* | 2/2013 | McCartney | G06T 13/20 345/419 |
| 2013/0250050 A1 | 9/2013 | Kanaujia et al. | |

(Continued)

FOREIGN PATENT DOCUMENTS

| | | |
|---|---|---|
| CN | 109859296 A | 6/2019 |
| CN | 110197149 A | 9/2019 |

(Continued)

OTHER PUBLICATIONS

CN-109859296-A (Machine Translation on Aug. 24, 2022), (2019), 52 pgs.

(Continued)

*Primary Examiner* — Yi Yang
(74) *Attorney, Agent, or Firm* — SCHWEGMAN LUNDBERG & WOESSNER, P.A.

(57) ABSTRACT

Aspects of the present disclosure involve a system for performing ray tracing between augmented reality (AR) and real-world objects. The system accesses, by the mobile device, a video depicting a first object. The system obtains, by the mobile device, a three-dimensional (3D) model of the first object. The system applies, by the mobile device, a ray tracing process to the 3D model of the first object to estimate an optical effect on a portion of the first object relative to a second object that is depicted in the video. The system modifies a visual property of the portion of the first object based on the optical effect relative to the second object.

20 Claims, 12 Drawing Sheets

(56) References Cited

U.S. PATENT DOCUMENTS

| | | | |
|---|---|---|---|
| 2014/0063016 A1* | 3/2014 | Howson | G06T 15/06 |
| | | | 345/426 |
| 2017/0094243 A1 | 3/2017 | Venkataraman et al. | |
| 2017/0329413 A1 | 11/2017 | Kramer et al. | |
| 2017/0372505 A1 | 12/2017 | Bhat et al. | |
| 2018/0182160 A1* | 6/2018 | Boulton | G02B 27/017 |
| 2018/0204111 A1 | 7/2018 | Zadeh et al. | |
| 2019/0088004 A1 | 3/2019 | Lucas et al. | |
| 2019/0122425 A1* | 4/2019 | Sheffield | H04N 13/243 |
| 2019/0220992 A1 | 7/2019 | Li et al. | |
| 2019/0259136 A1 | 8/2019 | Shpalensky et al. | |
| 2019/0370648 A1 | 12/2019 | Zoph et al. | |
| 2019/0378323 A1 | 12/2019 | Bakalash et al. | |
| 2020/0105056 A1 | 4/2020 | Mitchell et al. | |
| 2020/0111233 A1 | 4/2020 | Thyagharajan et al. | |
| 2020/0175375 A1 | 6/2020 | Chen et al. | |
| 2020/0184721 A1 | 6/2020 | Ge et al. | |
| 2021/0150197 A1 | 5/2021 | Kokkinos et al. | |
| 2021/0150806 A1 | 5/2021 | Guler et al. | |
| 2021/0209797 A1 | 7/2021 | Lee et al. | |
| 2021/0233305 A1 | 7/2021 | Garcia et al. | |
| 2021/0241522 A1 | 8/2021 | Guler et al. | |
| 2021/0271866 A1 | 9/2021 | Hayakawa et al. | |
| 2021/0334993 A1 | 10/2021 | Woodford | |
| 2021/0350621 A1 | 11/2021 | Bailey et al. | |
| 2021/0358197 A1 | 11/2021 | Shysheya et al. | |
| 2021/0358203 A1 | 11/2021 | Dixit | |
| 2021/0398351 A1 | 12/2021 | Papandreou et al. | |
| 2021/0407163 A1 | 12/2021 | Chai et al. | |
| 2022/0101608 A1 | 3/2022 | Hu et al. | |
| 2022/0182534 A1* | 6/2022 | Bleyer | H04N 5/265 |
| 2022/0198209 A1* | 6/2022 | Spears | G06V 10/454 |
| 2022/0375247 A1 | 11/2022 | Kokkinos et al. | |
| 2022/0383582 A1* | 12/2022 | Chen | G06T 15/06 |
| 2023/0009367 A1 | 1/2023 | Goodman et al. | |

FOREIGN PATENT DOCUMENTS

| | | |
|---|---|---|
| CN | 113168710 A | 7/2021 |
| CN | 114930399 A | 8/2022 |
| WO | WO-2020088092 A1 | 5/2020 |
| WO | WO-2020099338 A1 | 5/2020 |
| WO | WO-2021094526 A1 | 5/2021 |
| WO | WO-2021227694 A1 | 11/2021 |
| WO | WO-2021262667 A1 | 12/2021 |
| WO | WO-2024186936 A1 | 9/2024 |

OTHER PUBLICATIONS

Bogo, Federica, et al., "Keep It SMPL: Automatic Estimation of 3D Human Pose and Shape from a Single Image", International Conference on Financial Cryptography and Data Security; [Lecture Notes in Computer Science; Lect. Notes Computer]. Springer. Berlin. Heidelberg, (2016), 561-578.

Guler, Riza Alp, et al., "DensePose: Dense Human Pose Estimation in the Wild", arXiv: 1802.00434v1, (Feb. 2018), 12 pgs.

Guler, Riza Alp, et al., "HoloPose: Holistic 3D Human Reconstruction in-the-Wild", CVPR, (Jun. 20, 2019), 10884-10894.

Kanazawa, Angjoo, et al., "End-to-End Recovery of Human Shape and Pose", 2018 IEEE/CVF Conference on Computer Vision and Pattern Recognition (CVPR) IEEE Computer Society, (Jun. 1, 2018), 10 pgs.

Kato, Hiroharu, et al., "Neural 3D Mesh Renderer", IEEE/CVF Conference on Computer Vision and Pattern Recognition, IEEE, (Jun. 18, 2018), 3907-3916.

Neverova, N, et al., "Dense Pose Transfer", Lecture Notes in Computer Science—Computer Vision—ECCV 2018—15th European Conference vol. 11207 LNC, (2018), 128-143.

Pavlakos, Georgios, et al., "Expressive Body Capture: 3D Hands, Face, and Body From a Single Image (with supplementary material)", IEEE/CVF Conference on Computer Vision and Pattern Recognition (CVPR), (Jun. 15, 2019), 1-22.

Sanzari, Marta, et al., "Bayesian Image Based 3D Pose Estimation", International Conference on Financial Cryptography and Data Security; [Lecture Notes in Computer Science; Lect.Notes Computer]. Springer. Berlin. Heidelberg, (Sep. 17, 2016), 566-582.

Shysheya, Aliaksandra, et al., "Textured Neural Avatars", 2019 IEEE/CVF Conference on Computer Vision and Pattern Recognition (CVPR), IEEE, (Jun. 15, 2019), 2382-2392.

Sigal, Leonid, et al., "Combined discriminative and generative articulated pose and non-rigid shape estimation", Nips'07 Proceedings of the 20th International Conference on Neural Information Processing Systems, (Dec. 2007), 8 pgs.

Zanfir, Andrei, et al., "Monocular 3D Pose and Shape Estimation of Multiple People in Natural Scenes: The Importance of Multiple Scene Constraints", In IEEE/CVF Conference on Computer Vision and Pattern Recognition (CVPR), IEEE Computer Society, (Jun. 1, 2018), 2148-2157.

Zhang, Jian, et al., "Learning 3D faces from 2D images via Stacked Contractive Autoencoder", Neurocomputing, vol. 257, (Sep. 27, 2017), 67-78.

Zhang, Quanshi, et al., "When 3D Reconstruction Meets Ubiquitous RGB-D Images", IEEE Conference on Computer Vision and Pattern Recognition IEEE, (2014), 700-707.

"International Application Serial No. PCT/US2024/018737, International Search Report mailed Jul. 10, 2024", 5 pgs.

"International Application Serial No. PCT/US2024/018737, Written Opinion mailed Jul. 10, 2024", 7 pgs.

Lira Dos Santos, Artur, et al., "Real Time Ray Tracing for Augmented Reality", 2012 14th Symposium on Virtual and Augmented Reality, (May 2012), 131-140.

* cited by examiner

RAY TRACING BETWEEN AR AND REAL OBJECTS

TECHNICAL FIELD

The present disclosure relates generally to generating images and providing augmented reality (AR) experiences using an interaction application.

BACKGROUND

AR is a modification of a real-world environment with the addition or overlay of virtual content. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
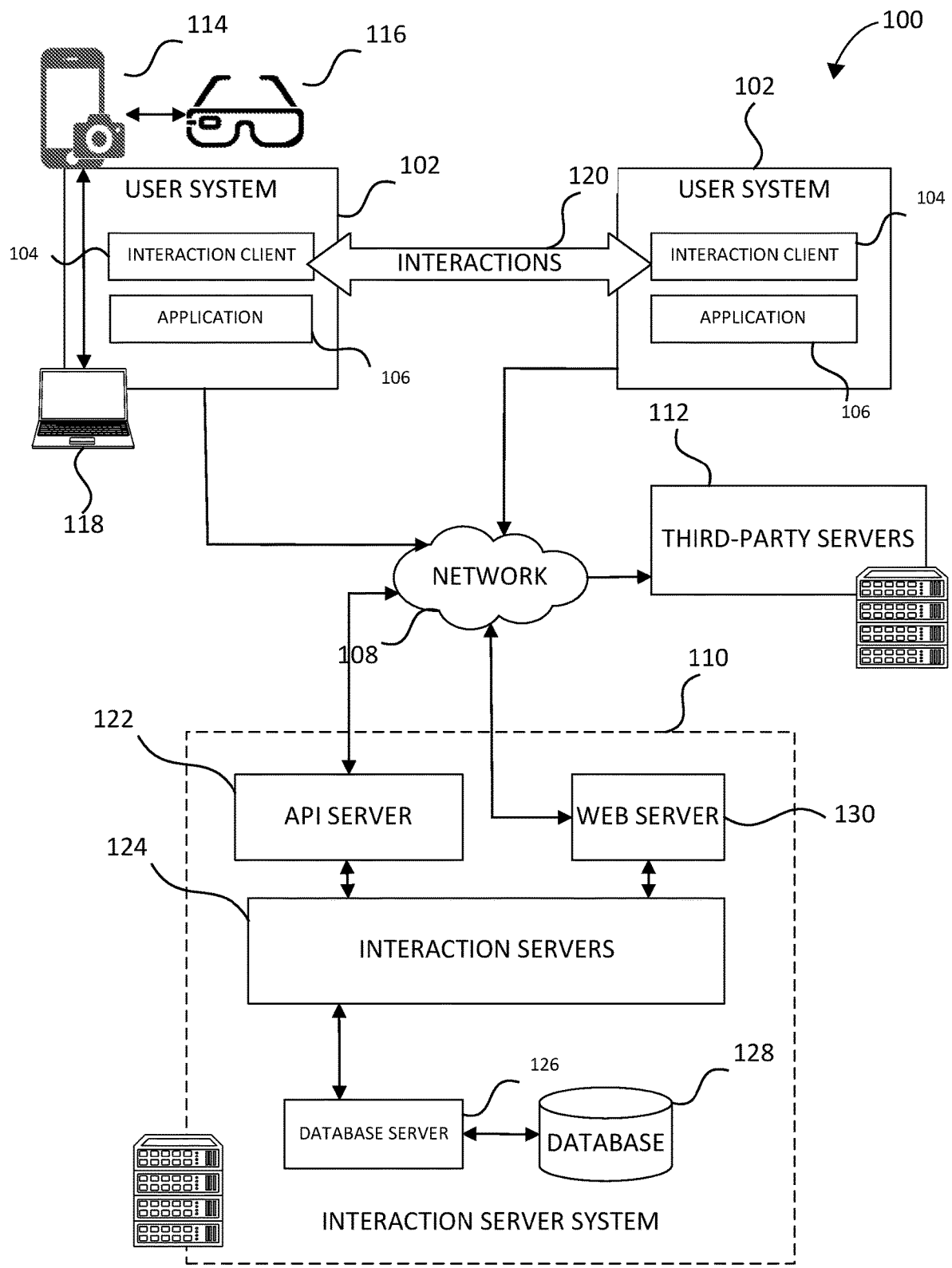
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, messaging applications and other social network platforms allow users to view a live or real-time camera feed that depicts the users wearing different items. For example, a user can activate a virtual try-on experience in which one or more AR items are placed on the user depicted in the image in real-time. This provides a user with the ability to visualize how different products look on the user before the user purchases the products. To activate such experiences, users can browse products through one software application, such as a website. The user can select a given product, such as a fashion item, depicted on the website. Then, the user is presented with an option to launch an AR shopping experience application in which the user can virtually try on the selected product.

A video depicting the user trying on the product is presented to the user in a separate application associated with the AR shopping experience. Namely, the user is navigated away from the website to a whole other experience to provide the user with the virtual try-on experience. The need to navigate the user away from the website makes online shopping difficult because the user has to continuously navigate back and forth between the AR try-on experience and the display of the products on the website. Having to navigate through a multitude of pages of information just to virtually try on certain products and to select new products to try on in a separate interface is discouraging and very disruptive. Also, having to re-launch the AR experience each time a new product is selected consumes a great deal of resources and is incredibly inefficient.

In addition, typical AR shopping experiences are provided on mobile devices, which have very limited resources, such as limited processing power and battery. These mobile devices are incapable of providing realistic AR experiences because they lack the resources needed to generate realistic lighting conditions and reflections of various real-world and virtual objects. As such, even though the AR experiences generally work well, the lack of realism due to missing reflections and inaccurate light projections takes away from the illusion that the virtual objects are actually part of the real-world scene. This makes it difficult for users to visualize how different AR fashion items and products look in the real world. Some known systems use ray tracing techniques to estimate the light projections and absorption to accurately generate reflections on various objects in an image. However, current ray tracing techniques consume a great deal of resources and are difficult to implement on mobile devices. Accordingly, the current ray tracing techniques are generally applicable in desktop settings where previously captured images are enhanced and modified and cannot be used in everyday mobile settings where real-time videos are captured and augmented with AR objects.

The disclosed techniques seek to improve the efficiency of using a mobile device by providing an AR experience that uses ray tracing techniques and a ray tracing process to generate realistic reflections on real-world and/or virtual objects placed in a real-time video feed. Namely, the disclosed techniques access, by a mobile device, a video depicting a first object. The disclosed techniques obtain, by the mobile device, a three-dimensional (3D) model of the first object and apply a ray tracing process to the 3D model of the first object to estimate an optical effect on a portion of the first object relative to a second object that is depicted in the video. The disclosed techniques then modify one or more visual properties of the portion of the first object based on the optical effect relative to the second object.

For example, a virtual mirror can be used to generate a virtual reflection of a real-world or virtual object that is depicted in the video feed. As another example, a virtual light that is emanating from a real-world or virtual object is reflected off of a virtual or real-world object which changes the color and/or intensity of a portion of the object off of which the virtual light is reflected. As another example, the disclosed techniques can store or remember textures of various real-world and virtual (e.g., AR) objects that are depicted across various frames of a real-time video feed. The disclosed techniques can then use those previously stored textures to generate or estimate reflections of those textures on other objects even when portions of the real-world and virtual objects are no longer visible in a current frame of a video. For example, the texture of the palm of a hand can be stored, such that when the palm of the hand is turned away from the camera lens to face an AR mirror and is no longer visible, the texture of the palm of the hand can be represented or reflected off of the AR mirror. This provides a more realistic AR experience for the user which improves the overall user experience and reduces the amount of resources needed to accomplish a task.

This can reduce the overall time and expense incurred by users trying on different fashion items, such as shoes, shirts, earrings, watches, or other fashion items. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102 (also referred to herein as user systems 102), each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the client systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of, and separately from, the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
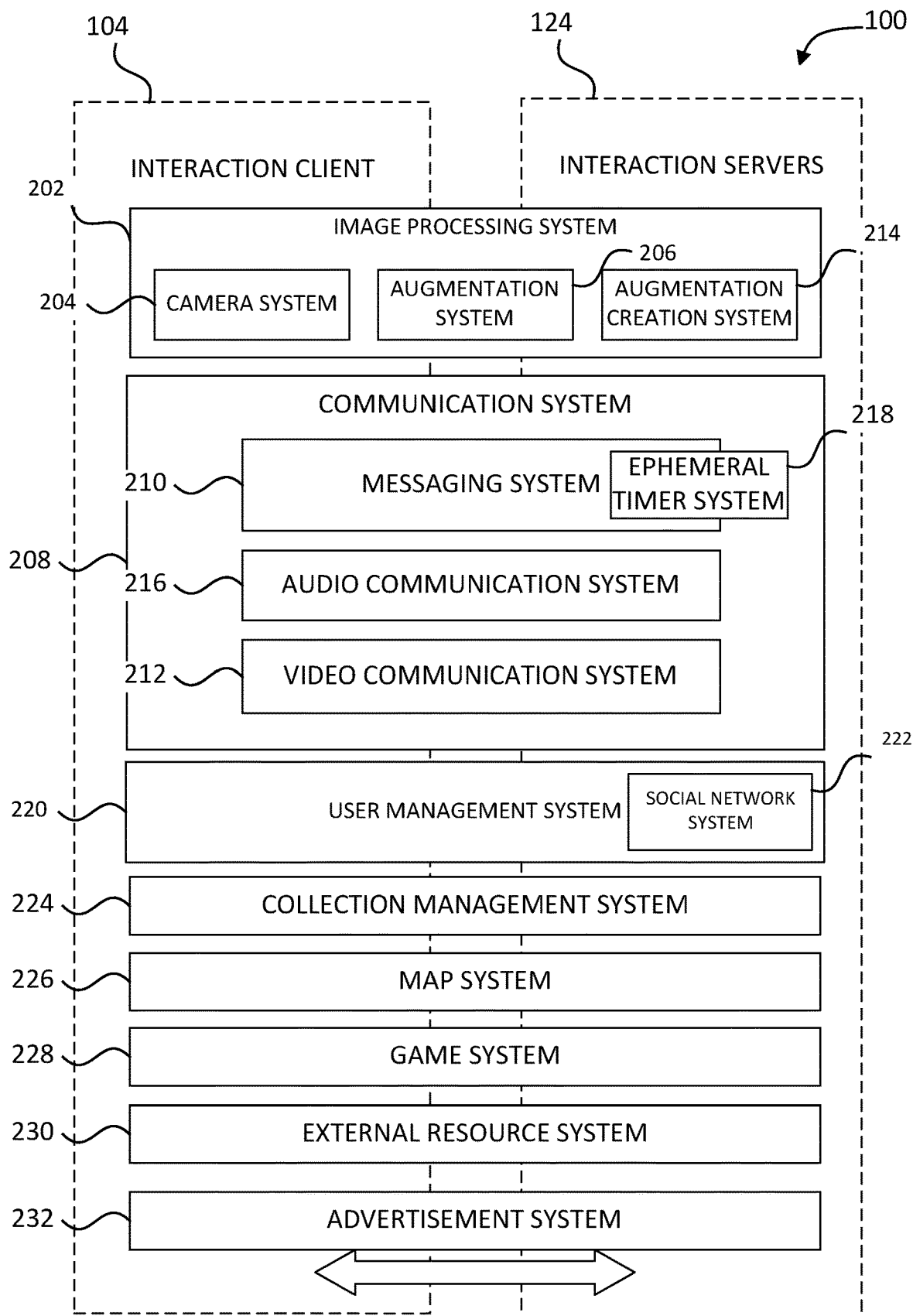
FIG. 2 is a diagrammatic representation of an interaction application, in accordance with some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a ray tracing AR system 500 that enables a user to launch an AR experience in which a video depicting a user of the user system 102 is modified to overlay an AR object, such as an AR fashion item, and one or more ray tracing processes are applied to the video to generate or estimate optical effects (e.g., reflections, refractions, absorption, and so forth) between real-world and virtual objects. An illustrative implementation of the ray tracing AR system 500 is shown and described in connection with FIG. 5 below.

Specifically, the ray tracing AR system 500 is a component that can be accessed by an AR/VR application implemented on the user system 102. The AR/VR application uses an RGB camera to capture a monocular image of a real-world object. The AR/VR application applies various trained machine learning techniques or machine learning models on the captured image of the real-world object to generate body landmark features representing the real-world object depicted in the images or videos and to apply one or more AR visual effects to the captured image or video based on body landmark features. In some cases, the AR/VR application generates a 3D model of the real-world and/or virtual objects depicted in the video feed. The 3D model can represent a transparent version of the objects, which allows the AR/VR application to estimate how different light is reflected and in what direction light is reflected off of each pixel of the object. The 3D model is also used to generate a texture for each portion of the object so that when a given portion is no longer visible in the video, the texture of the given portion can still be used to estimate optical effects on other objects that are depicted in the video feed. In some implementations, the AR/VR application continuously captures images of the user and updates the body landmark features in real time or periodically to continuously or periodically update the applied one or more visual effects. This allows the user to move around in the real world and see the one or more visual effects update in real time.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1006 (shown in FIG. 10) of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302, shown in FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, e.g., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The ray tracing AR system 500 accesses, by the user system 102 (e.g., a mobile device), a video depicting a first object. The ray tracing AR system 500 obtains, by the user system 102, a 3D model of the first object. The ray tracing AR system 500 applies, by the user system 102, a ray tracing process to the 3D model of the first object to estimate an optical effect on a portion of the first object relative to a second object that is depicted in the video. The ray tracing AR system 500 modifies a visual property of the portion of the first object based on the optical effect relative to the second object.

Data Architecture

Figure 3:
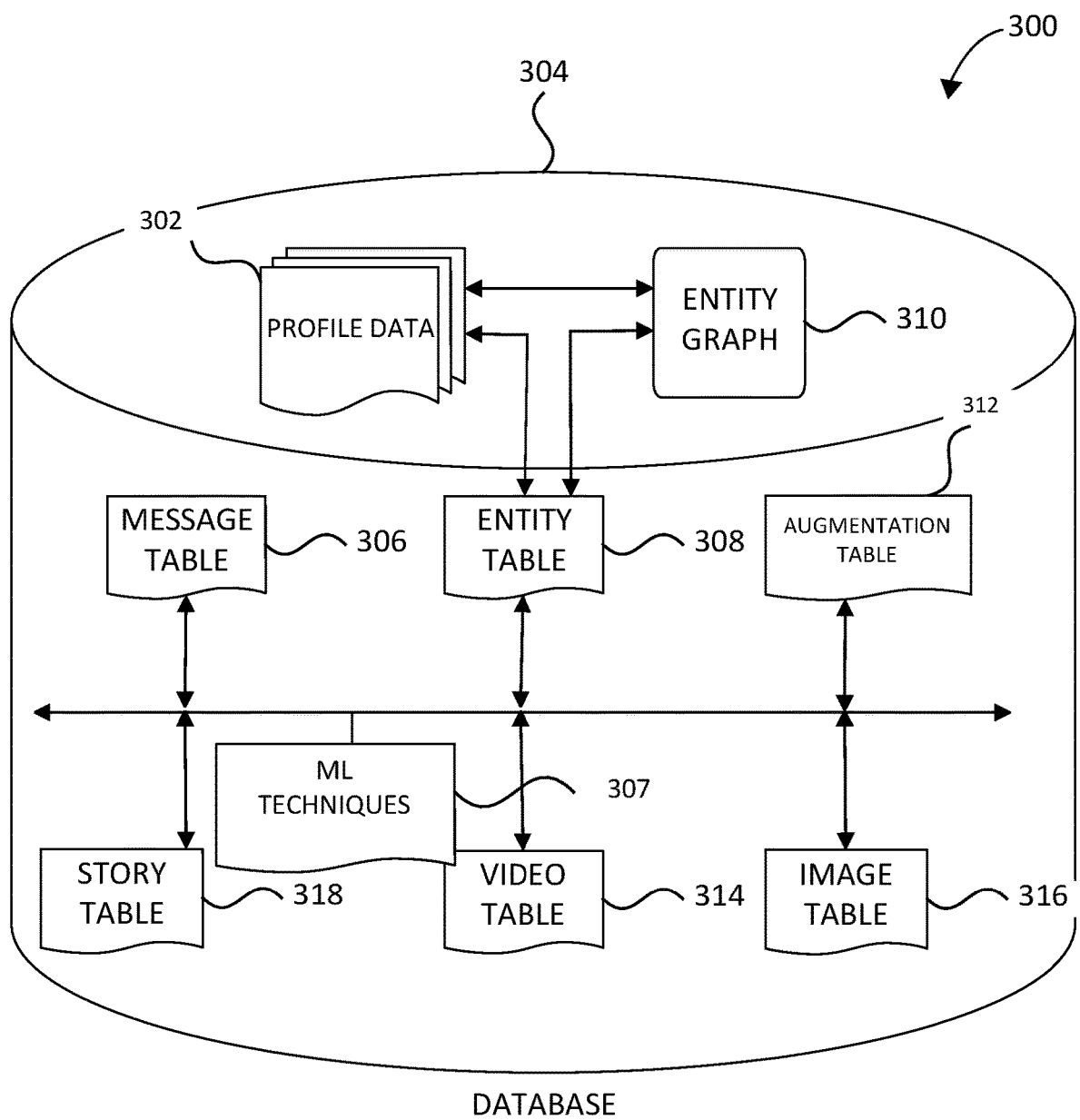
FIG. 3 is a diagrammatic representation of a data structure as maintained in a database, in accordance with some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning (ML) technique(s) 307 that stores parameters of one or more machine learning models that have been trained during training of the fashion item transfer system 500. For example, trained machine learning techniques 307 stores the trained parameters of one or more artificial neural network machine learning models or techniques.

Data Communications Architecture

Figure 4:
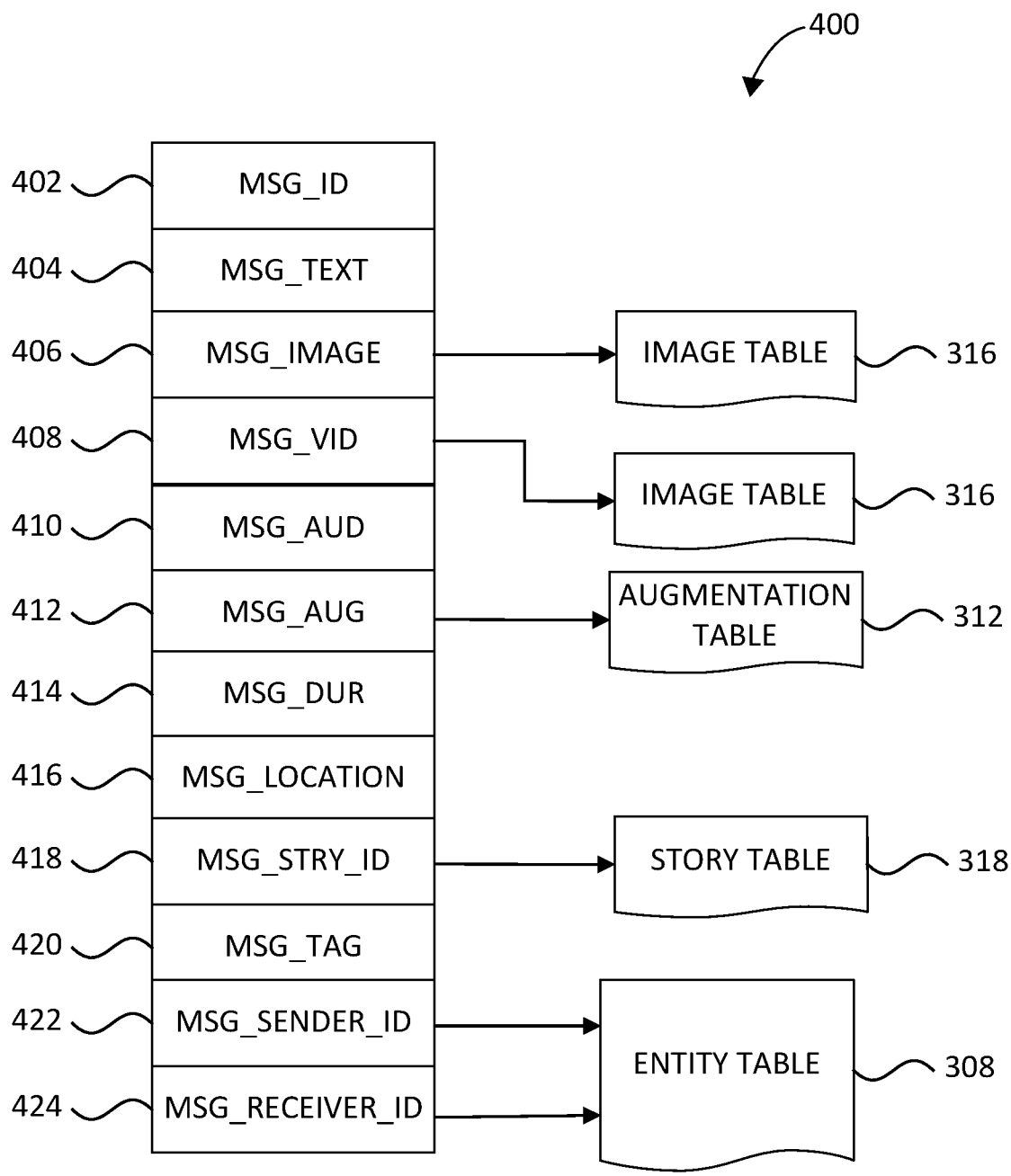
FIG. 4 is a diagrammatic representation of a message, in accordance with some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Ray Tracing AR System

Figure 5:
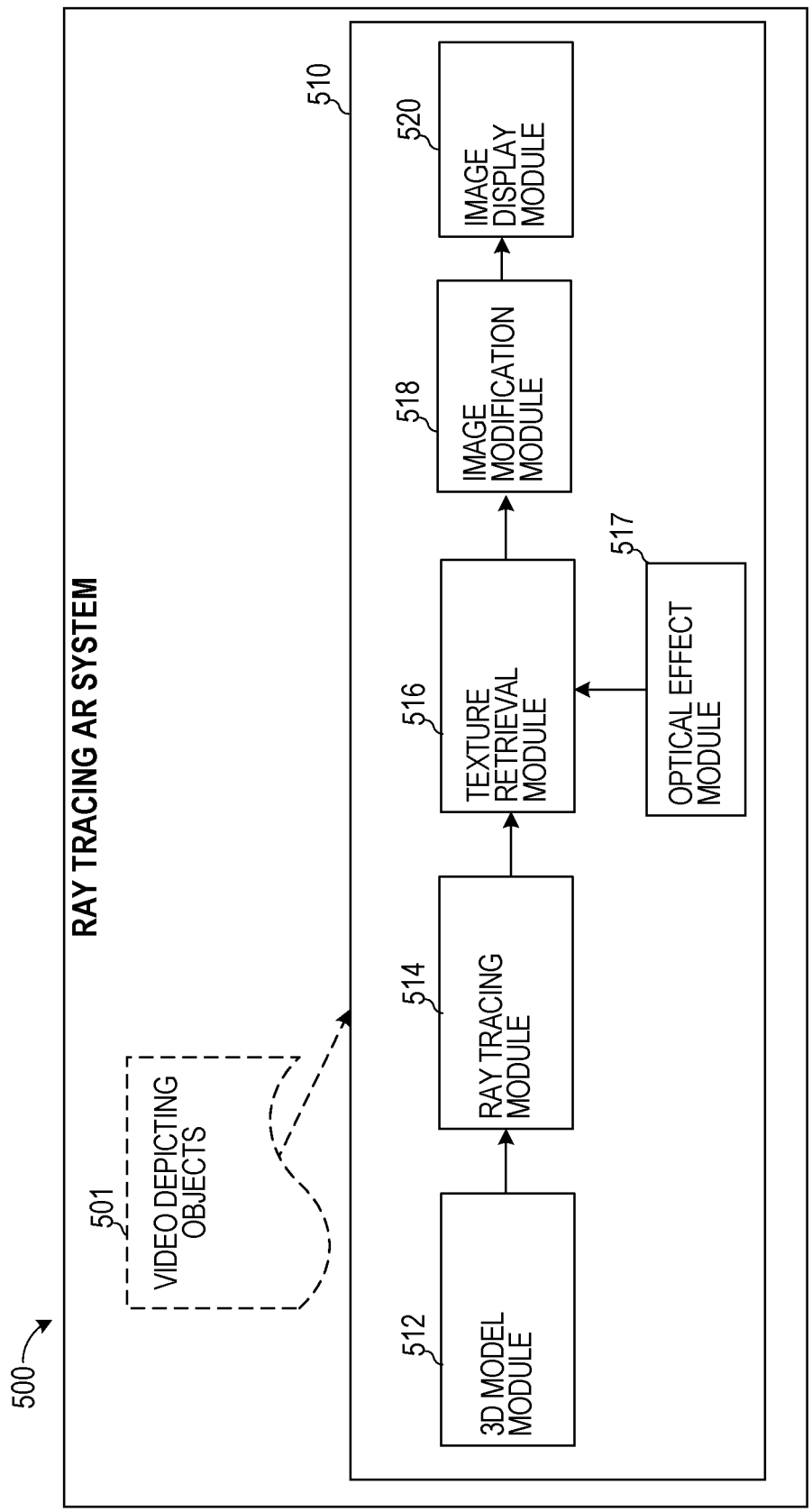
FIG. 5 is a block diagram showing an example ray tracing AR system, according to some examples.

FIG. 5 is a block diagram showing an example ray tracing AR system 500, according to example examples. The ray tracing AR system 500 includes a set of components 510 that operate on a set of input data (e.g., a video 501 including one or more frames depicting multiple real-world and virtual (AR) objects in a real-world environment). The ray tracing AR system 500 includes a 3D model module 512, a ray tracing module 514, a texture retrieval module 516, an optical effect module 517, an image modification module 518, and an image display module 520. All or some of the components of the ray tracing AR system 500 can be implemented by a server, in which case, the video 501 is provided to the server by the user system 102. In some cases, some or all of the components of the ray tracing AR system 500 can be implemented by the user system 102 or can be distributed across a set of user systems 102.

In some examples, the ray tracing AR system 500 accesses a video depicting a first object and obtains, by the mobile device, a 3D model of the first object. The ray tracing AR system 500 applies a ray tracing process to the 3D model of the first object to estimate an optical effect on a portion of the first object relative to a second object that is depicted in the video. The ray tracing AR system 500 modifies a visual property of the portion of the first object based on the optical effect relative to the second object. In some examples, the first object is a real-world object depicted in the video and the second object is an AR object. In some examples, the first object is an AR object and the second object is a real-world object. In some examples, the first object is a first AR object and the second object is a second AR object.

In some examples, the optical effect includes at least one of reflection, refraction, soft shadows, scattering, depth of field, motion blur, ambient occlusion, or dispersion. In some examples, the ray tracing AR system 500 applies a first trained machine learning model to the first object to generate a segmentation of the first object and applies a second trained machine learning model to the segmentation to generate the 3D model of the first object. The 3D model of the first object can include a transparent version of the first object.

In some examples, the ray tracing AR system 500, in response to applying the ray tracing process, identifies a region of the second object that is intersected by one or more rays associated with the portion of the first object. The ray tracing AR system 500 retrieves a light attribute of the region of the second object and blends the light attribute of the region of the second object into a light attribute of the portion of the first object. In some examples, the ray tracing AR system 500 receives configuration information indicating a level of quality for the optical effect. In some examples, the ray tracing AR system 500 determines that the level of quality is greater than a threshold quality level. The ray tracing AR system 500, in response to determining that the level of quality level is greater than the threshold, generates a plurality of rays as the one or more rays in association with a single pixel of the portion of the first object.

In some examples, the ray tracing AR system 500 determines that the level of quality is less than a threshold quality level. The ray tracing AR system 500, in response to determining that the level of quality is less than the threshold quality level, generates a single ray as the one or more rays in association with a single pixel of the portion of the first object.

In some examples, the light attribute of the region of the second object includes a first color. The light attribute of the portion of the first object includes a second color. In some examples, the light attribute of the region of the second object includes a first intensity and the light attribute of the portion of the first object includes a second intensity.

In some examples, the ray tracing AR system 500 detects a first region of the second object in a first frame of the video. The ray tracing AR system 500 stores a texture corresponding to the first region that is depicted in the first frame. The ray tracing AR system 500 determines that the first region of the second object is no longer visible in a second frame of the video that is subsequent to the first frame and modifies the visual property of the portion of the first object depicted in the second frame using the texture of the first region that is no longer visible in the second frame, such as based on a previously generated 3D model.

In some examples, the portion of the first object reflects the texture of the first region of the second object. The first object includes an AR fashion item and the second object includes a body part of a real-world person depicted in the video. In some examples, the ray tracing AR system 500 constructs a 3D model of the second object that represents textures of the second object of portions that are visible and portions that are absent from the video over a plurality of video frames.

In some examples, the ray tracing AR system 500, in response to applying the ray tracing process, identifies the first region of the second object that is intersected by one or more rays associated with the portion of the first object in the second frame. The ray tracing AR system 500 identifies the first region in the 3D model of the second object and retrieves the texture of the first region from the 3D model to modify the visual property of the portion of the first object.

In some examples, the ray tracing AR system 500 applies, in a first frame of the video, a first modification to the portion of the first object in response to determining that the second object has a first light attribute. The ray tracing AR system 500 determines that the second object has been changed to have a second light attribute in a second frame of the video. The ray tracing AR system 500, in response to determining that the second object has been changed to have the second light attribute, applies, in the second frame of the video, a second modification to the portion of the first object.

In some examples, the ray tracing AR system 500 displays a first frame of the video that depicts the first object and the second object and receives input to activate the ray tracing process. In response to receiving the input to activate the ray tracing process, the ray tracing AR system 500 animates, over a plurality of video frames subsequent to the first frame, the modification of the visual property of the portion of the first object based on the optical effect relative to the second object. The animating includes presenting, in a second frame subsequent to the first frame, a first section of the first object including initial visual attributes depicted in the first frame unmodified by the optical effect while a second section of the first object includes a modified visual attribute that is generated based on the optical effect. The animation also includes presenting, in a third frame subsequent to the second frame, the first section of the first object including the modified visual attributes associated with the optical effect together with the second section of the first object.

The 3D model module 512 processes the video 501 to detect and identify one or more virtual and/or real-world objects depicted in the video 501. In some cases, the 3D model module 512 processes multiple frames of the video 501 to generate a 3D model for each of the objects depicted in the video 501. In case of a virtual object, the 3D model module 512 accesses the 3D model of the virtual object from a source of the virtual object to avoid having to generate the 3D model. In the case of a real-world object, the 3D model module 512 applies one or more machine learning models to the real-world object to generate a segmentation of the real-world object and extract features, such as textures, of the real-world object. The 3D model module 512 then applies one or more machine learning models to the segmentation to generate a 3D model of the real-world object. The 3D model module 512 can wait for all of the portions of the real-world object to be visible across multiple frames to complete the generation of the 3D model. In some cases, rather than waiting for all of the portions to become visible, the 3D model module 512 estimates or predicts how the textures of the real-world object look to generate the 3D model even for textures that are not visible in any portion of the video 501.

For example, the 3D model module 512 implements one or more machine learning models (e.g., one or more neural networks) that have been trained to detect and track one or more persons and/or body parts and/or other real-world objects in one or more video frames. For example, during training, the machine learning model of the 3D model module 512 receives a given training image (or video) from a plurality of training images (or videos) that depict one or more persons and/or body parts and/or real-world objects. The plurality of training images is associated with corresponding ground truth 3D models of the persons and/or body parts depicted in the training images and can be received or accessed from training image data stored in data structures 300. The 3D model module 512 applies one or more machine learning models to a given training image. The ray tracing module 514 generates at least a portion of a 3D model for the persons and/or body parts and/or real-world objects depicted in the given training image.

The 3D model module 512 obtains a known or predetermined ground-truth 3D model for the portion corresponding to the given training image. The 3D model module 512 compares (computes a deviation between) the estimated portion of the 3D model with the ground truth 3D model. Based on a difference threshold of the comparison (or deviation), the 3D model module 512 updates one or more coefficients or parameters and obtains one or more additional training images from the training data. After a specified number of epochs or batches of training images have been processed and/or when a difference threshold (or deviation) (computed as a function of a difference or deviation between the estimated 3D model portion and the ground-truth 3D model portion) reaches a specified value, the 3D model module 512 completes training, and the parameters and coefficients of the 3D model module 512 are stored as a trained machine learning technique.

In some examples, the 3D model module 512 can be used to detect one or more persons and/or body parts and/or real-world objects in an image of a real-world environment. The 3D model module 512 can provide a 3D model for persons and/or body parts and/or real-world objects estimated from the captured images to the ray tracing module 514. In some cases, the 3D model is a transparent 3D model that lacks any textures and is used only to estimate reflections and/or absorptions of light for each pixel of the corresponding real-world object.

The ray tracing module 514 implements one or more ray tracing techniques and can be in communication with the optical effect module 517. The ray tracing module 514 generates one or more rays for each pixel of each object that is depicted in the video 501. In some cases, the ray tracing module 514 traces a path (e.g., a ray) from an imaginary eye through each pixel in a virtual screen, and calculates the color of the object visible through it. Each ray can be tested for intersection with some subset of all the objects in the scene. Once the nearest object has been identified, the optical effect module 517 estimates the incoming light at the point of intersection, examines the material properties of the object, and combines this information to calculate the final color of the pixel. Certain illumination algorithms and reflective or translucent materials may require more rays to be re-cast into the scene. The optical effect module 517 can implement any one or combination of ray casting algorithms including a volume ray casting algorithm, a signed distance function (SDF) ray marching algorithm, a recursive ray tracing algorithm, beam tracing, con tracing, distributed ray tracing, and so forth.

In some examples, the tracing of the rays can be performed in different manners for rays of different wavelengths. For example, in order to render different reflective/refractive surfaces, a ray of a first color can correspond to a first wavelength. Such a ray can be traced according to a first ray tracing technique to identify a point of intersection with a second object. A ray of a second color can correspond to a second wavelength. Such a ray can be traced according to a second ray tracing technique to identify another point of intersection with the second object.

For example, the ray tracing module 514 can obtain from the 3D model module 512 a transparent 3D model of each object in the video 501. The ray tracing module 514 can then determine or estimate the direction of each ray associated with each pixel represented by the transparent 3D model. The rays represent the direction and/or orientation of light that scatters and/or is reflected off of each pixel. In this way, the ray tracing module 514 can estimate how light bounces off one real-world or virtual object in relation to another real-world or virtual object. In some examples, the optical effect module 517 can provide configuration information that indicates a level of quality for each object that is depicted. The level of quality can differ based on real-world and virtual objects.

In some examples, the ray tracing module 514 can select a given object that is depicted in the video 501. The ray tracing module 514 can obtain the configuration information for the given object to determine the level of quality for the given object. In response to determining that the level of quality transgresses a level of quality threshold, the ray tracing module 514 selects a first quantity of rays (e.g., 4 rays) to estimate for each pixel of the given object using the 3D model of the given object. In response to determining that the level of quality fails to transgress the level of quality threshold, the ray tracing module 514 selects a second quantity of rays (e.g., 1 ray) to estimate for each pixel of the given object using the 3D model of the given object. In some cases, the rays represent how light bounces off portions of an object and, in other cases, the rays represent how light is absorbed by the portions of the object.

The ray tracing module 514 provides the results of the ray tracing process and/or operations to the texture retrieval module 516. The texture retrieval module 516 can process the rays to identify portions of a second object that are intersected by the rays emanating from one or more pixels of a first object. In response to determining that a first portion of the second object (which can be a real-world or virtual object depicted in the video 501) is intersected or corresponds to a direction of one or more rays associated with a region of a first object (which can be a real-world or virtual object depicted in the video 501), the texture retrieval module 516 retrieves the texture of the first portion of the second object. For example, the texture retrieval module 516 communicates with the 3D model module 512 to retrieve the 3D model of the second object. The texture retrieval module 516 identifies the portion of the 3D model of the second object that matches the first portion of the second object intersected or corresponds to the direction of the one or more rays associated with the region of the first object.

The texture retrieval module 516 obtains the texture in the identified portion of the 3D model that includes the color and/or intensity of the light (e.g., light attributes and/or properties) of the identified portion. The texture retrieval module 516 then communicates with the optical effect module 517 to apply the texture to the region of the first object from which the rays were generated or emanated. In some cases, the optical effect module 517 combines or blends the light attributes and/or properties (e.g., color and intensity) of the region of the first object with the color and/or intensity of the light (e.g., light attributes and/or properties) of the identified portion of the second object. This results in a perceived or simulated reflection of the identified portion of the second object in the region of the first object.

The texture retrieval module 516 monitors the video 501 to detect changes in the identified portion of the second object. For example, the identified portion of the second object can correspond to a screen of a real-world or virtual mobile phone. The screen can emanate a first color with a first intensity at a first video frame of the video 501. In such cases, the optical effect module 517 modifies or blends the light attributes and/or properties (e.g., color and intensity) of the region of the first object using the first color (e.g., yellow). For example, the region of the first object can be in a second color (e.g., blue) and, as a result of the blending with the first color, the region of the first object is modified to be in a third color (e.g., green, which represents blending or mixing of yellow with blue). Later, the screen can emanate a fourth color with a second intensity at a second video frame of the video 501. In such cases, the optical effect module 517 modifies or blends the light attributes and/or properties (e.g., color and intensity) of the region of the first object using the fourth color (e.g., orange). For example, the region of the first object can be in a second color (e.g., blue) and, as a result of the blending with the fourth color, the region of the first object is modified to be in a fifth color (e.g., brown, which represents blending or mixing of orange with blue). The manner in which the pixels or colors and/or intensities are mixed can be defined by a configuration file associated with each object and can specify an optical effect, such as reflection, refraction, soft shadows, scattering, depth of field, motion blur, ambient occlusion, and/or dispersion.

In some examples, the optical effect module 517 determines the spatial arrangement of objects in the video 501 based on their respective 3D models. The optical effect module 517 can determine that the second object is closer to the camera or lens than the first object or vice versa. In such cases, the optical effect module 517 can determine that the rays projected from the first object intersect a portion of the second object that is in front of the first object. Namely, the rays can be determined to intersect a portion of the second that is behind in 3D a portion that is visible in the video 501. For example, the first object can be a virtual mirror and the second object can be a hand of a person. The hand of the person can be turned to face the mirror, such that the palm of the hand is facing the mirror and is not visible directly (is not in the line of site of the camera lens). The portion of the hand that is visible is the back of the hand. In such cases, to maintain the illusion that the mirror is actually part of the video 501, the palm of the hand may need to be reflected by the virtual mirror because the rays emanating from the mirror intersect the palm of the hand and not the back of the hand. In such cases, the texture retrieval module 516 can retrieve a previously generated 3D model of the hand that includes the texture of the palm of the hand that is not currently visible in the current video frame. The texture retrieval module 516 applies the texture of the palm of the hand to the lighting attributes or properties of the mirror to cause the mirror to reflect or show the palm of the hand (e.g., the texture of the palm of the hand) that is not currently visible in the current video frame. The 3D model may have been generated using prior video frames relative to the current frame when the palm of the hand was actually visible in the prior video frames.

The texture retrieval module 516 provides the modification to each of the objects to the image modification module 518. The image modification module 518 modifies the real-world video 501 based on the modifications received from the texture retrieval module 516 and provides the modified video to the image display module 520 for display on a screen of the user system 102.

Figure 6:
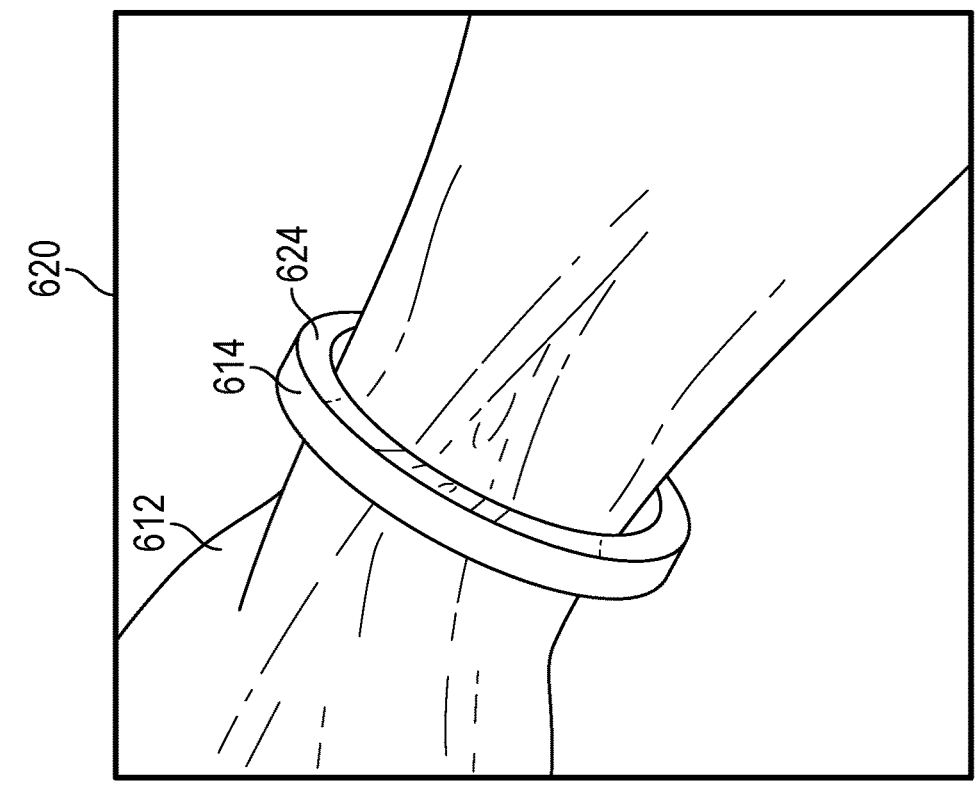
FIGS. 6-8 are diagrammatic representations of inputs and outputs of the ray tracing AR system, in accordance with some examples.
Figure 6:
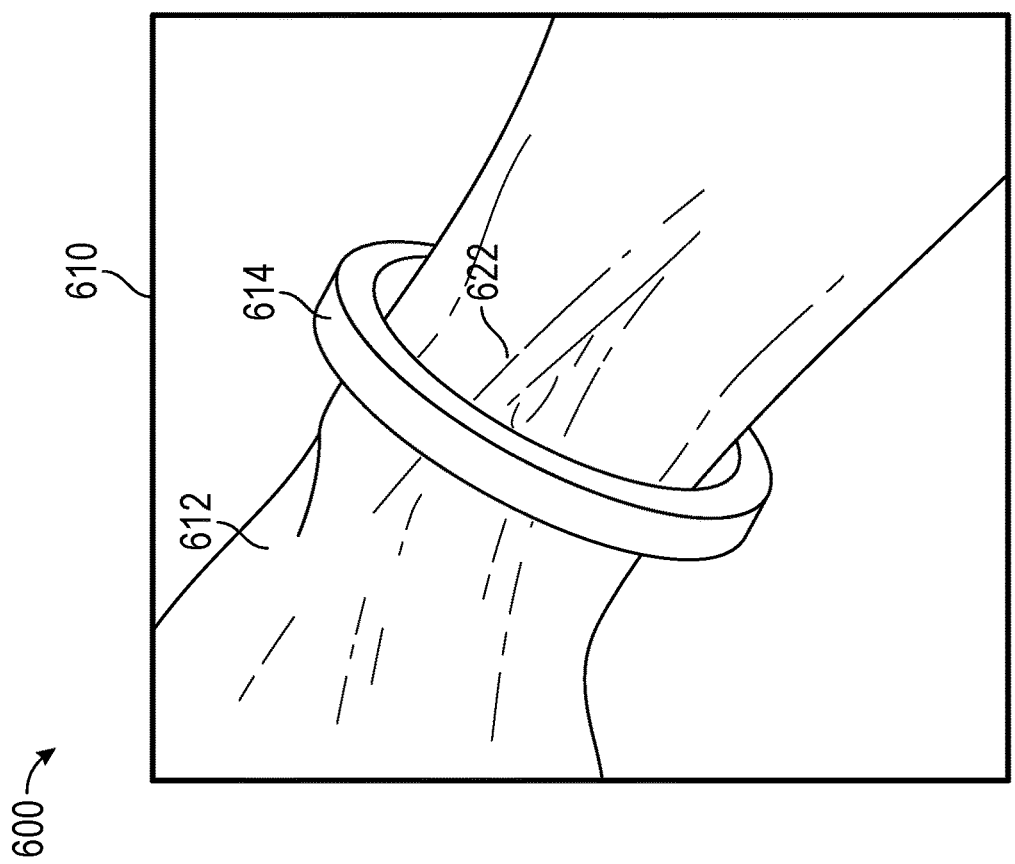
Figure 7:
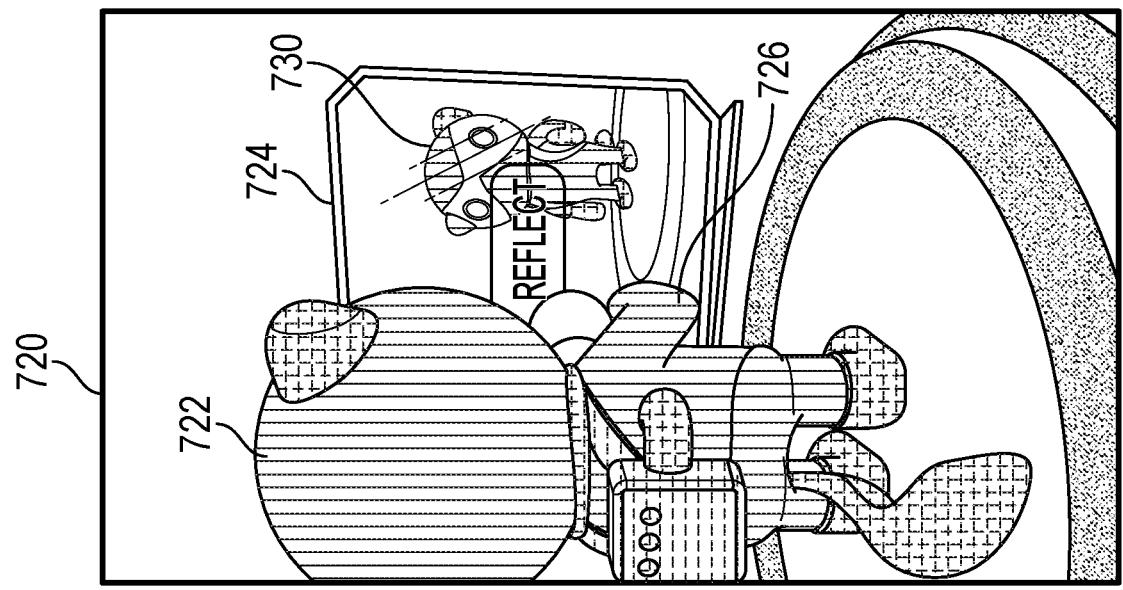
Figure 7:
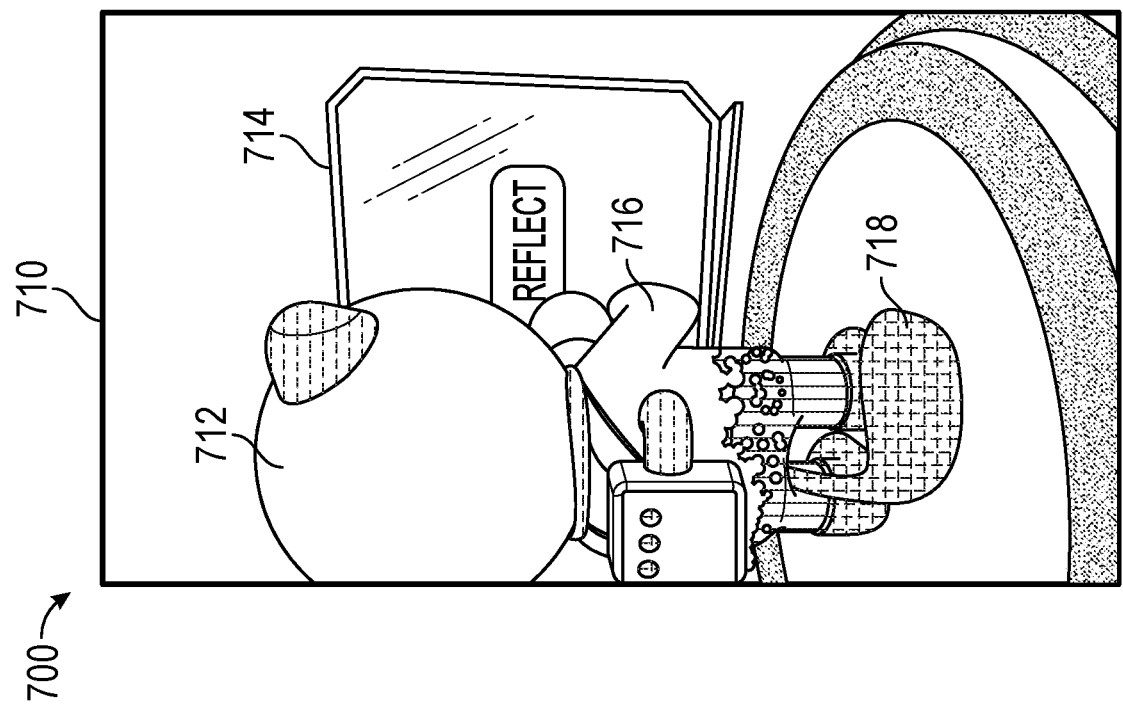
Figure 8:
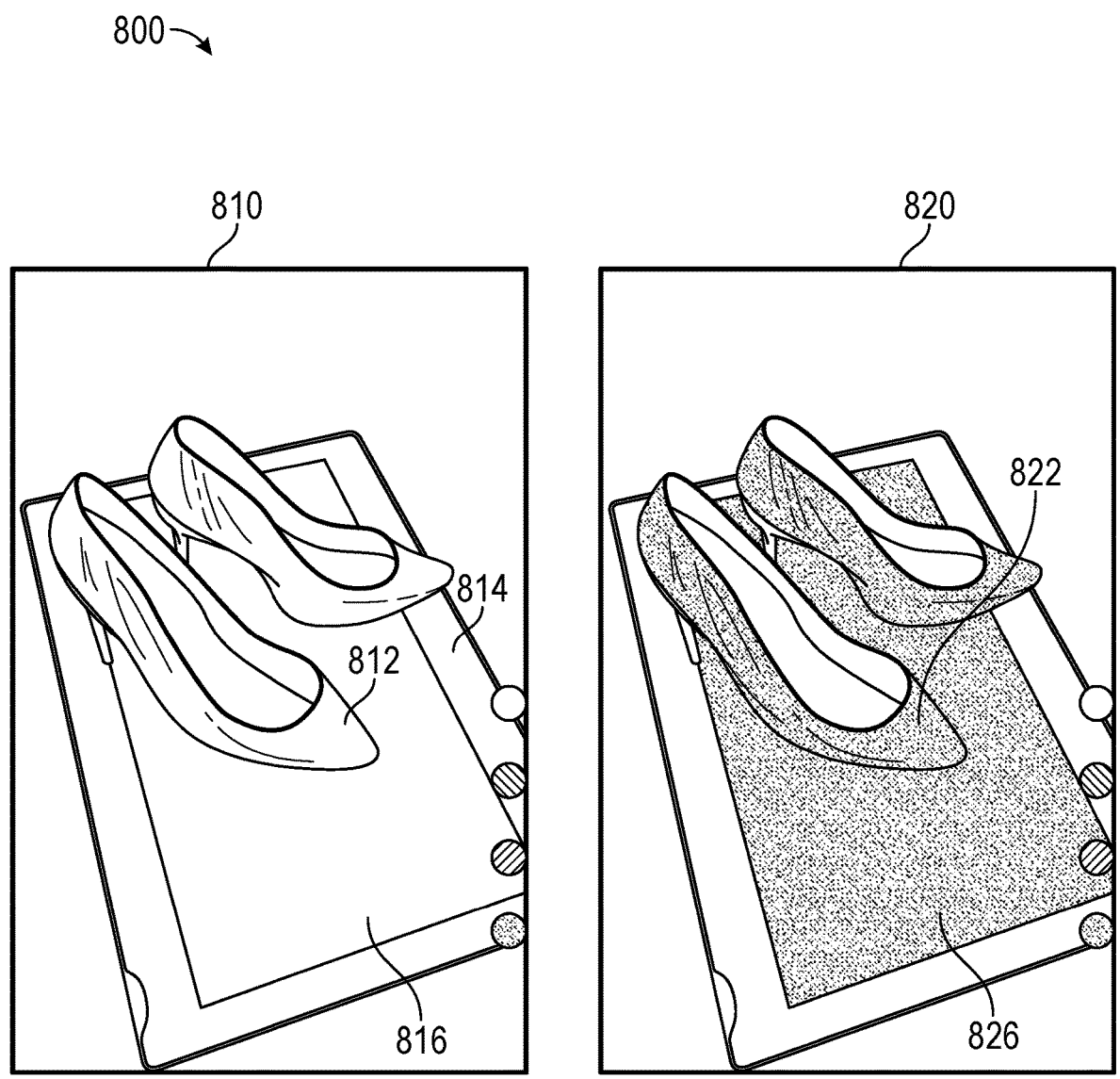

FIGS. 6-8 are diagrammatic representations of inputs and outputs of the ray tracing AR system 500, in accordance with some examples. For example, as shown in FIG. 6, a set of images 600 are depicted that show differences prior to and after application of ray tracing techniques to modify objects. Specifically, the image 610 includes a depiction of a first object 614 (e.g., an AR fashion item) and a second object 612 (e.g., a real-world body part, such as a wrist). The first object 614 is placed on top of the second object 612. The image 610 depicts placement of the first object 614 on top of the second object 612 without applying ray tracing techniques to modify the first object 614 based on the second object 612 or vice versa. The AR system 500 can determine that a portion of the first object 614 has rays that intersect a portion 622 of the second object 612.

The AR system 500 can receive input to activate ray tracing and modify the image 610 using the ray tracing techniques. In response, the AR system 500 generates an image 620. As shown in the image 620, the portion 624 of the first object 614 has been blended based on light attributes (e.g., color and intensity) of the portion 622 of the second object 612 that is intersected by the rays emanating from the portion 624. Specifically, a color and intensity of the light of pixels of the portion 622 are blended with the color and intensity of the portion of the first object 614 from which the rays emanate and intersect the portion 622. Now, the portion 624 has been modified using the color and intensity of the portion 622 and appears to reflect the portion 622. The image 610 and the image 620 can correspond to individual frames of the video 501.

In some cases, the initiation or performance of the modification of an object to reflect light attributes of another object using ray tracing is animated, as shown in FIG. 7. Specifically, an image 710 can be presented which corresponds to a first frame of the video 501. The image 710 depicts a first object 714 (e.g., a virtual object) and a second object 712 (e.g., another virtual object). In the image 710, the second object 712 includes a first portion 716 that is in a first color (e.g., white) and a second portion 718 that is in a second color. The first object 714 can generate light or virtually emit light that is in the second color. The image 710 can correspond to an AR experience in which ray tracing is not being performed. Accordingly, the second object 712 is not reflected or depicted in the first object 714.

The AR system 500 can receive input that activates the ray tracing process or techniques. In response, the AR system 500 triggers an animation of the second object 712 that slowly and progressively changes colors of each portion of the second object 712 based on light of the object intersected by rays projected from the portion of the second object 712, such as starting from a bottom portion of the second object 712 until a top portion of the second object 712 is reached. The second object 712 is processed to determine that rays emanating or projecting from the second object 712 intersect the first object 714. In response, the AR system 500 applies a color and intensity of the light that is being emitted by the first object 714 to the color and intensity of the light attributes or colors of each portion of the second object 712. Namely, the second object 712 is slowly modified and animated to be changed from the first color to the second color being generated or emitted from the first object 714 such that a bottom portion is changed first in a second video frame followed by changing a middle portion of the second object 712 to be in the second color in a third video frame and then finally the top portion of the second object 712 is changed to be in the second color in a fourth video frame. For example, as shown in the image 720, the second object 722 is entirely in the second color 726 corresponding to the light being emitted by the first object 724.

Similarly, the AR system 500 can determine that rays projected from the first object 724 intersect a front region of the second object 722 that is not visible in the image 720. In response, the AR system 500 retrieves a previously generated 3D model of the second object 722 (e.g., generated based on prior frames when the front of the second object 722 was visible). The AR system 500 obtains the texture of the front region of the second object 722 that is not visible in the current image 720. The AR system 500 modifies pixel values of the first object 724 from which the rays are projected and intersect the front region of the second object 722 to blend with the values of the texture of the front region of the second object 722. This results in the first object 724 now showing a reflection 730 of the second object 722 including a front region of the second object 722 that is not visible in the image 720.

For example, as shown in FIG. 8, a set of images 800 are depicted that show application of ray tracing techniques to modify objects. Specifically, the image 810 includes a depiction of a first object 812 (e.g., an AR fashion item) and a second object 816 (e.g., a real-world mobile device screen). The image 810 depicts placement of the first object 812 on top of the second object 816. The AR system 500 can determine that a portion of the first object 812 has rays that intersect a portion of the second object 816. In response, the AR system 500 modifies the portion of the first object 812 to be or correspond or blend with a color of the second object 816. At a later time, a color of the second object 816 is changed to be in the color 826. In response, the AR system 500 modifies the first object 812 to have a new color 822 that is a mixture of pixel values of the first object 812 and the color 826 to which the second object 816 has been changed. This ensures that as objects change light attributes, those light attributes continue to be reflected by other objects based on ray tracing techniques across multiple video frames.

Figure 9:
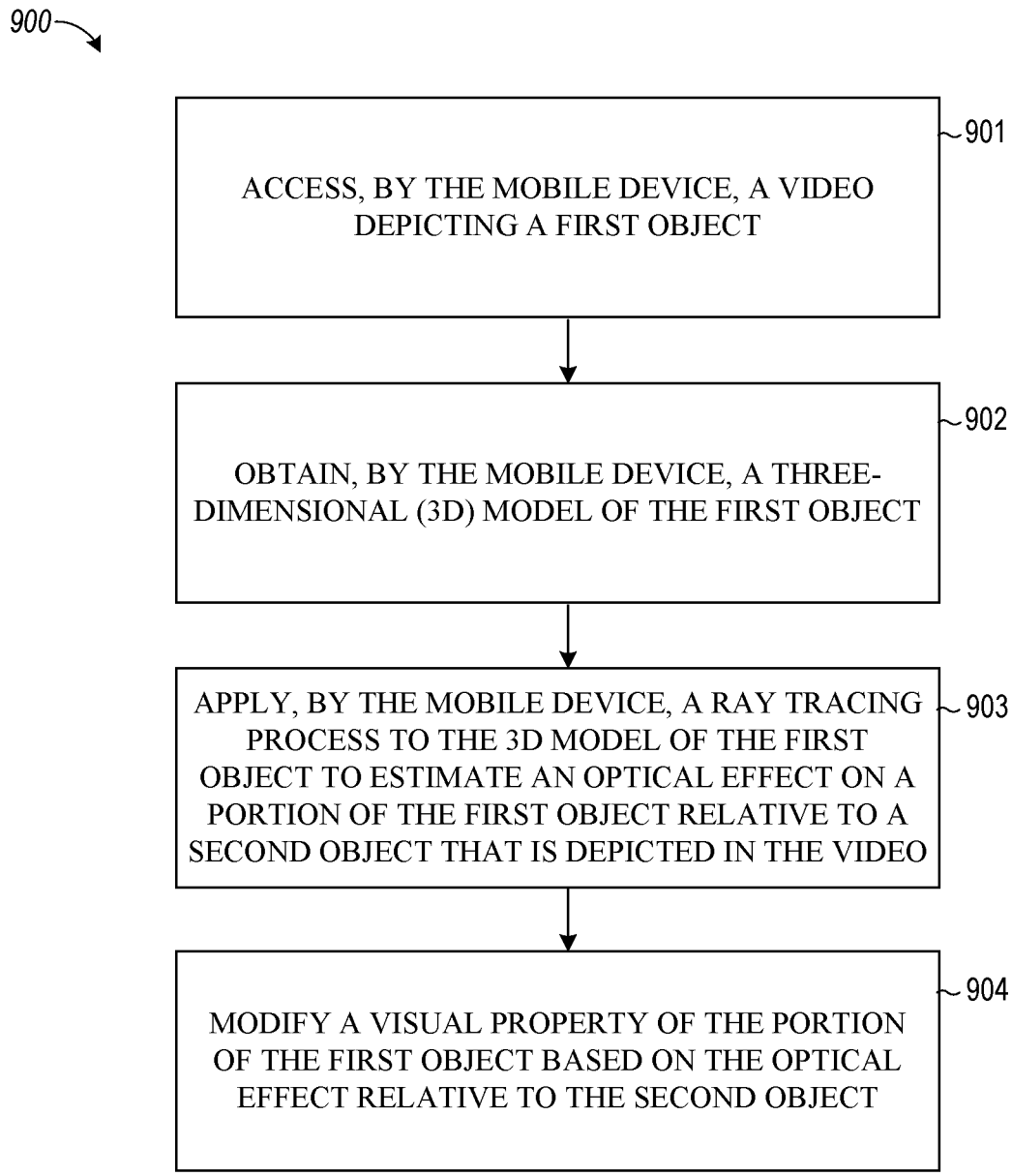
FIG. 9 is a flowchart illustrating example operations of the ray tracing AR system, according to some examples.

FIG. 9 is a flowchart of a process 900, in accordance with some examples. Although the flowchart describes the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the ray tracing AR system 500 (e.g., a server or user system 102) accesses a video depicting a first object, as discussed above.

At operation 902, the ray tracing AR system 500 obtains a 3D model of the first object, as discussed above.

At operation 903, the ray tracing AR system 500 applies a ray tracing process to the 3D model of the first object to estimate an optical effect on a portion of the first object relative to a second object that is depicted in the video, as discussed above.

At operation 904, the ray tracing AR system 500 modifies a visual property of the portion of the first object based on the optical effect relative to the second object, as discussed above.

Machine Architecture

Figure 10:
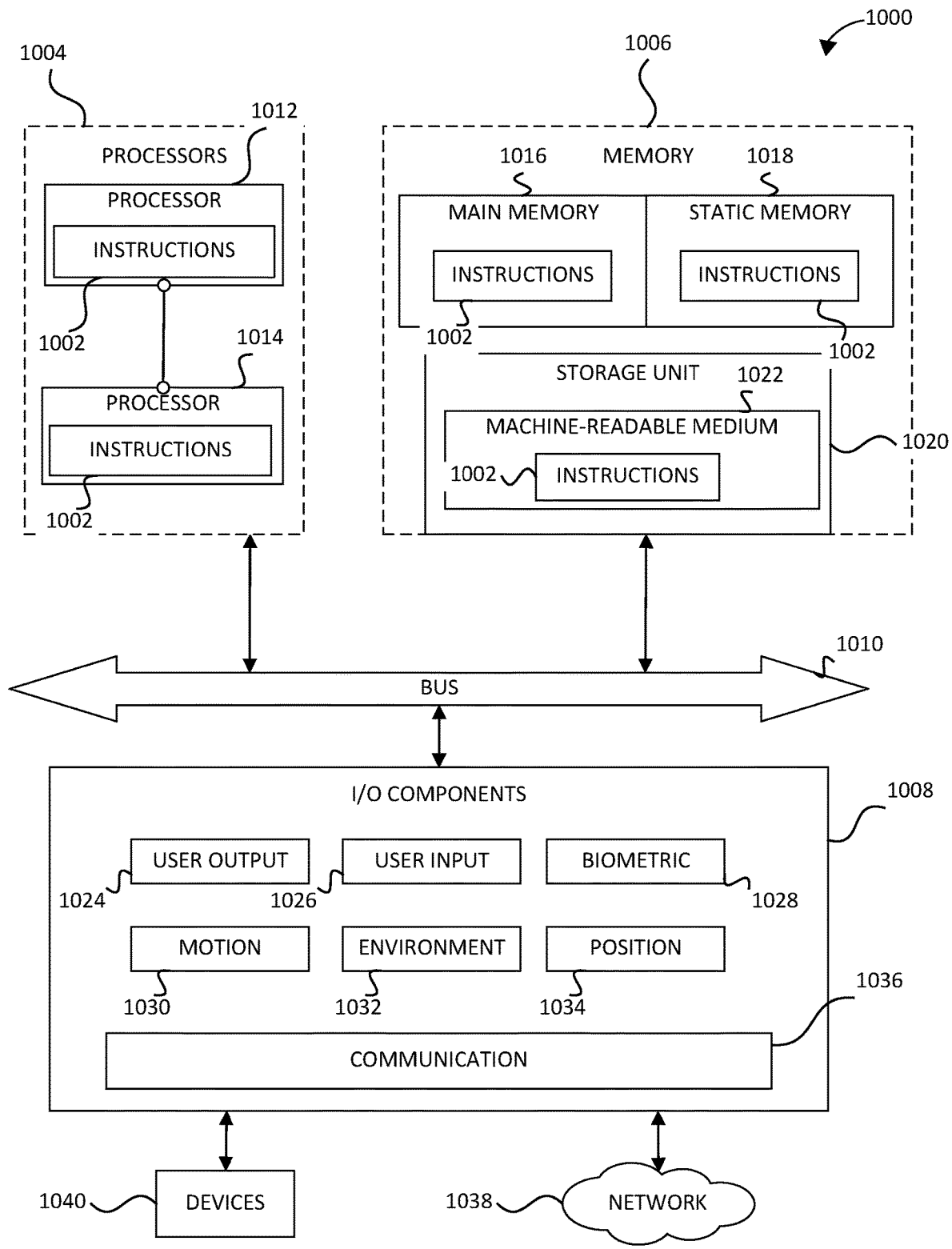
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
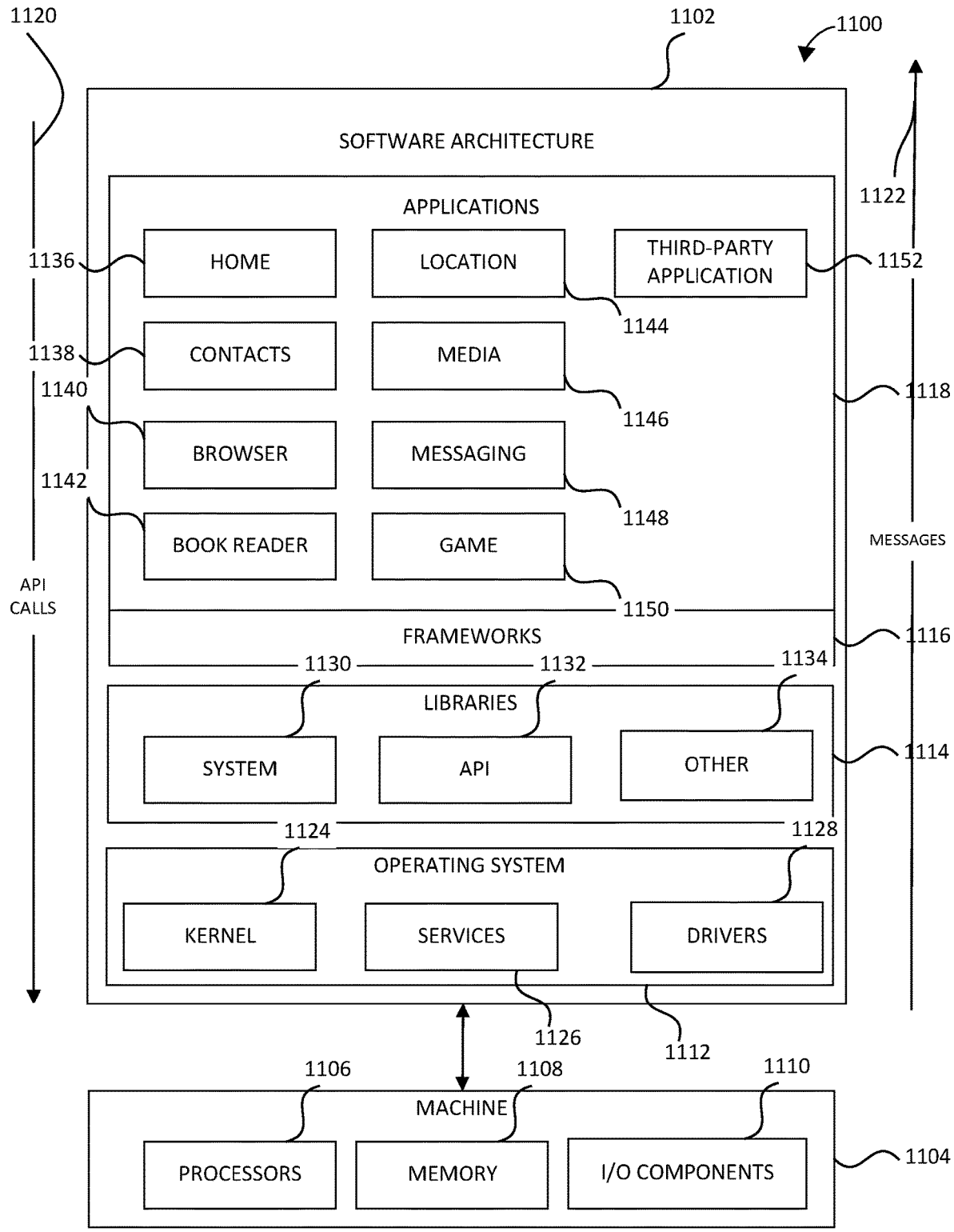
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

System with Head-Wearable Apparatus

Figure 12:
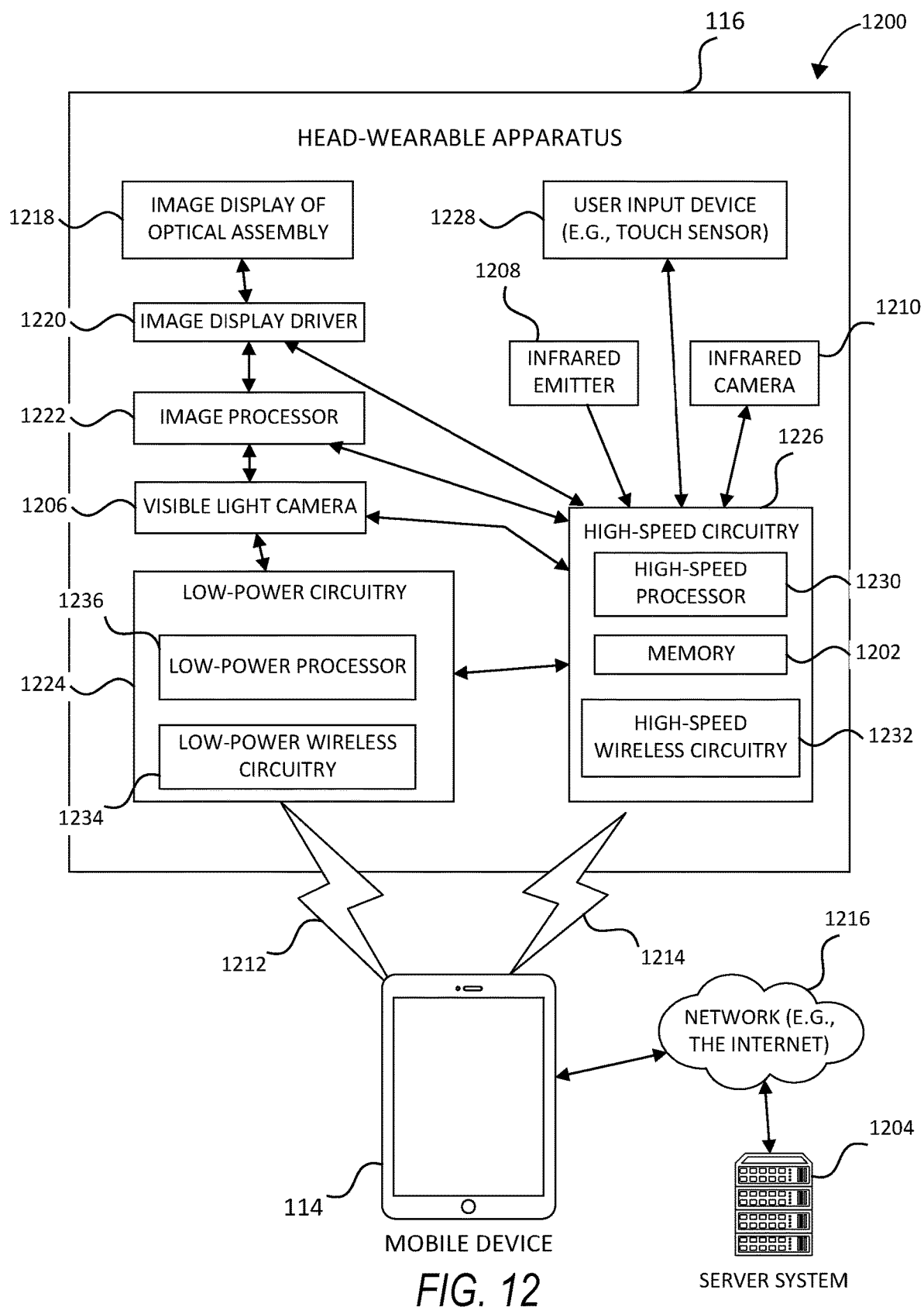
FIG. 12 illustrates a system in which a head-wearable apparatus may be implemented, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    accessing, by a mobile device, a video depicting a first object;
    obtaining, by the mobile device, a three-dimensional (3D) model of the first object,
    in response to receiving input that activates a ray tracing process, applying, by the mobile device, the ray tracing process to the 3D model of the first object to estimate an optical effect on a portion of the first object relative to a second object that is depicted in the video;
    modifying a visual property of the portion of the first object based on the optical effect relative to the second object;
    detecting a first region of the second object in a first frame of the video;
    storing a texture corresponding to the first region that is depicted in the first frame;
    determining that the first region of the second object is no longer visible in a second frame of the video that is subsequent to the first frame; and
    modifying the visual property of the portion of the first object depicted in the second frame using the texture of the first region that is no longer visible in the second frame.

2. The method of claim 1, further comprising:
    in response to receiving the input to activate the ray tracing process, animating, over a plurality of video frames subsequent, the modifying of the visual property of the portion of the first object based on the optical effect relative to the second object.

3. The method of claim 1, wherein the first object is a first augmented reality (AR) object, and wherein the second object is a second AR object.

4. The method of claim 1, wherein the optical effect comprises at least one of reflection, refraction, soft shadows, scattering, depth of field, motion blur, ambient occlusion, or dispersion.

5. The method of claim 1, further comprising:
    applying a first trained machine learning model to the first object to generate a segmentation of the first object; and
    applying a second trained machine learning model to the segmentation to generate the 3D model of the first object, the 3D model of the first object comprising a transparent version of the first object.

6. The method of claim 1, further comprising:
    in response to applying the ray tracing process, identifying a region of the second object that is intersected by one or more rays associated with the portion of the first object;

retrieving a light attribute of the region of the second object; and
blending the light attribute of the region of the second object into a light attribute of the portion of the first object.

7. The method of claim 6, further comprising:
receiving configuration information indicating a level of quality for the optical effect.

8. The method of claim 7, further comprising:
determining that the level of quality is greater than a threshold quality level; and
in response to determining that the level of quality level is greater than the threshold quality level, generating a plurality of rays as the one or more rays in association with a single pixel of the portion of the first object.

9. The method of claim 7, further comprising:
determining that the level of quality is less than a threshold quality level; and
in response to determining that the level of quality is less than the threshold quality level, generating a single ray as the one or more rays in association with a single pixel of the portion of the first object.

10. The method of claim 6, wherein the light attribute of the region of the second object comprises a first intensity, and wherein the light attribute of the portion of the first object comprises a second intensity.

11. The method of claim 1, further comprising:
selecting between generating a single ray and generating a plurality of rays for the ray tracing process based on a determined level of quality associated with the optical effect indicated in configuration information.

12. The method of claim 1, wherein the portion of the first object reflects the texture of the first region of the second object, wherein the first object comprises an augmented reality fashion item, and wherein the second object comprises a body part of a real-world person depicted in the video.

13. The method of claim 1, further comprising:
constructing a three-dimensional (3D) model of the second object that represents textures of the second object of portions that are visible and portions that are absent from the video over a plurality of video frames.

14. The method of claim 13, further comprising:
in response to applying the ray tracing process, identifying the first region of the second object that is intersected by one or more rays associated with the portion of the first object in the second frame;
identifying the first region in the 3D model of the second object; and
retrieving the texture of the first region from the 3D model to modify the visual property of the portion of the first object.

15. The method of claim 1, further comprising:
applying, in a first frame of the video, a first modification to the portion of the first object in response to determining that the second object has a first light attribute;
determining that the second object has been changed to have a second light attribute in a second frame of the video; and
in response to determining that the second object has been changed to have the second light attribute, applying, in the second frame of the video, a second modification to the portion of the first object.

16. The method of claim 1, further comprising:
displaying the first frame of the video that depicts the first object and the second object;

in response to receiving the input to activate the ray tracing process, animating, over a plurality of video frames subsequent to the first frame, the modifying of the visual property of the portion of the first object based on the optical effect relative to the second object, wherein the animating comprises:
presenting, in the second frame subsequent to the first frame, a first section of the first object comprising initial visual attributes depicted in the first frame unmodified by the optical effect while a second section of the first object comprises a modified visual attribute that is generated based on the optical effect; and
presenting, in a third frame subsequent to the second frame, the first section of the first object comprising the modified visual attributes associated with the optical effect together with the second section of the first object.

17. A system comprising:
at least one processor of a mobile device programmed to perform operations comprising:
accessing, by the mobile device, a video depicting a first object;
obtaining, by the mobile device, a three-dimensional (3D) model of the first object;
in response to receiving input that activates a ray tracing process, applying, by the mobile device, the ray tracing process to the 3D model of the first object to estimate an optical effect on a portion of the first object relative to a second object that is depicted in the video;
modifying a visual property of the portion of the first object based on the optical effect relative to the second object;
detecting a first region of the second object in a first frame of the video;
storing a texture corresponding to the first region that is depicted in the first frame;
determining that the first region of the second object is no longer visible in a second frame of the video that is subsequent to the first frame; and
modifying the visual property of the portion of the first object depicted in the second frame using the texture of the first region that is no longer visible in the second frame.

18. A non-transitory machine-readable storage medium that includes instructions that, when executed by one or more processors of a mobile device, cause the mobile device to perform operations comprising:
accessing, by the mobile device, a video depicting a first object;
obtaining, by the mobile device, a three-dimensional (3D) model of the first object;
in response to receiving input that activates a ray tracing process, applying, by the mobile device, the ray tracing process to the 3D model of the first object to estimate an optical effect on a portion of the first object relative to a second object that is depicted in the video;
modifying a visual property of the portion of the first object based on the optical effect relative to the second object;
detecting a first region of the second object in a first frame of the video;
storing a texture corresponding to the first region that is depicted in the first frame;
determining that the first region of the second object is no longer visible in a second frame of the video that is subsequent to the first frame; and modifying the visual property of the portion of the first object depicted in the second frame using the texture of the first region that is no longer visible in the second frame.

19. The non-transitory machine-readable storage medium of claim 18, the operations comprising:
applying, in a first frame of the video, a first modification to the portion of the first object in response to determining that the second object has a first light attribute;
determining that the second object has been changed to have a second light attribute in a second frame of the video; and
in response to determining that the second object has been changed to have the second light attribute, applying, in the second frame of the video, a second modification to the portion of the first object.

20. The non-transitory machine-readable storage medium of claim 18, the operations comprising:
displaying the first frame of the video that depicts the first object and the second object;
in response to receiving the input to activate the ray tracing process, animating, over a plurality of video frames subsequent to the first frame, the modifying of the visual property of the portion of the first object based on the optical effect relative to the second object, wherein the animating comprises:

presenting, in the second frame subsequent to the first frame, a first section of the first object comprising initial visual attributes depicted in the first frame unmodified by the optical effect while a second section of the first object comprises a modified visual attribute that is generated based on the optical effect; and presenting, in a third frame subsequent to the second frame, the first section of the first object comprising the modified visual attributes associated with the optical effect together with the second section of the first object.

* * * * *